United States Patent
Zhang et al.

(10) Patent No.: US 10,165,784 B2
(45) Date of Patent: Jan. 1, 2019

(54) METHOD FOR PRESERVING AND CONDITIONING BEEF BY COMBINING COMPOSITE ESSENTIAL OIL AND MODIFIED ATMOSPHERE PACKAGING

(71) Applicants: Jiangnan University, Wuxi (CN); Nanjing Jianggao Drying Equipment Company Ltd., Nanjing (CN)

(72) Inventors: Min Zhang, Wuxi (CN); Lei Feng, Wuxi (CN); Huiqun Xu, Nanjing (CN); Weiming Zhang, Wuxi (CN)

(73) Assignees: Jiangnan University, Wuxi (CN); Nanjing Jianggao Drying Equipment Company Ltd., Nanjing (CN)

( * ) Notice: Subject to any disclaimer, the term of this patent is extended or adjusted under 35 U.S.C. 154(b) by 287 days.

(21) Appl. No.: 15/089,799

(22) Filed: Apr. 4, 2016

(65) Prior Publication Data

US 2017/0099848 A1  Apr. 13, 2017

(30) Foreign Application Priority Data

Oct. 12, 2015 (CN) .......................... 2015 1 0654918

(51) Int. Cl.
| | | |
|---|---|---|
| A23B 4/08 | (2006.01) | |
| A23B 4/20 | (2006.01) | |
| A23B 4/16 | (2006.01) | |
| A23L 13/40 | (2016.01) | |

(52) U.S. Cl.
CPC .................. *A23B 4/08* (2013.01); *A23B 4/16* (2013.01); *A23B 4/20* (2013.01); *A23L 13/43* (2016.08); *A23V 2002/00* (2013.01)

(58) Field of Classification Search
CPC .... A23B 4/00; A23B 4/08; A23B 4/14; A23B 4/18; A23B 4/16; A23B 4/20; A23L 13/43
USPC ........................................................ 426/310
See application file for complete search history.

(56) References Cited

U.S. PATENT DOCUMENTS

| | | | | |
|---|---|---|---|---|
| 4,818,548 A | * | 4/1989 | Cheng ...................... | A23B 4/00 426/129 |
| 2005/0118310 A1 | * | 6/2005 | Lacroix .................. | A23B 4/027 426/240 |

FOREIGN PATENT DOCUMENTS

| | | | | |
|---|---|---|---|---|
| CN | 101300996 A | * | 11/2008 | |
| CN | 101356935 A | | 2/2009 | |
| CN | 101889601 A | | 11/2010 | |
| CN | 102018263 A | * | 4/2011 | |

OTHER PUBLICATIONS

Chen et al., "Antimicrobial Activity of Illicium Verum Essential Oil and Application Research Thereof to Meat Preservation", China Academic Journal Electronic Publishing House, Apr. 2007, No. 4, 4 pages, China.
Fu et al., "Shelf-life Extension and Colour Stabilization of Pork Packaged in Modified Atmosphere Packaging", China Academic Journal Electronic Publishing House, 2009, p. 143-148, China.
Gu et al., "Study on Pork Preservation by Essential Oil from Perfume Material", China Academic Journal Electronic Publishing House, 2007, p. 498-500, vol. 28, No. 08, China.
Jiang et al., "Study on Pork Preservation by Essential Oil from Pepper", China Academic Journal Electronic Publishing House, 2012, 3 pages, China.
Liu, Lin et al., "Application of Spice Essential Oil in the Preservation of Pre-Processed Fresh Chicken", China Academic Journal Electronic Publishing House, 2009, p. 110-113, China.
Liu, Xiao-li et al., "Antibacterial Effect of Recomposed Essential Oils in Inhibiting Listeria monocytogenes on Chilled Pork", China Academic Journal Electronic Publishing House, 2010, 5 pages, China.
Liu, Xiao-li et al., "Fresh-keeping Effect of Recomposed Essential Oils on Chilled Pork", China Academic Journal Electronic Publishing House, 2010, 4 pages, China.
Wang et al., "Optimization of Gas Ratio in Modified Atmosphere Packaging Technology of Chilled Mutton", China Academic Journal Electronic Publishing House, 2014, p. 27-28, China.
Warburton et al., "Modern Food Microbiology", Chapters 9 and 21, Food Science Text Series, 37 pages.
Xie et al., "Effect of Modified Atmosphere Package with Varying Oxygen Concentrations Combined with Controlled Freezing-point Storage on Pork Fresh-keeping", China Academic Journal Electronic Publishing House, 2009, p. 307-311, vol. 25, No. 10, China.
Yao et al., "Preservation Effects of Cassia Essential Oil and Clove Essential Oil on Chilled Pork", China Academic Journal Electronic Publishing House, Sep. 2011, 3 pages, vol. 50, No. 17, China.
Zhang et al., "Bacterial Inhibition Activities of Essential Oil from Lotus Leaf Combined with MAP", China Academic Journal Electronic Publishing House, 2010, p. 57-60, China.

* cited by examiner

*Primary Examiner* — Jyoti Chawla
(74) *Attorney, Agent, or Firm* — The Webb Law Firm

(57) ABSTRACT

A method for preserving and conditioning beef comprises: cleaning and chopping picked fresh beef, dipping in composite essential oil prepared from clove essential oil, cinnamon essential oil and illicium verum essential oil for 30 s and taking out and draining slightly; placing the beef dipped into a modified atmosphere packaging box and fast precooling; inflating gas of mixed proportion into the cooled modified atmosphere packaging box with beef for preservation packaging and then storing at the low temperature of 0-4° C. The shelf life of the beef packaged by the method is up to 24 d. The aerobic bacterial count is not over 6.0 lgcfu/g. A total volatile basic nitrogen TVB-N value is not over 20 mg/100 g and belongs to the range of second freshness. The beef is stable in color, is cherry-red, has the advantage of good preservation effect and is used for cooking preserved cooked beef.

3 Claims, No Drawings

METHOD FOR PRESERVING AND CONDITIONING BEEF BY COMBINING COMPOSITE ESSENTIAL OIL AND MODIFIED ATMOSPHERE PACKAGING

CROSS-REFERENCE TO RELATED APPLICATION

This application claims priority to Chinese Patent Application No. 201510654918.2 filed Oct. 12, 2015, the disclosure of which is hereby incorporated in its entirety by reference.

BACKGROUND

Technical Field

The present invention relates to a method for preserving and conditioning beef by combining essential oil and modified atmosphere packaging, particularly to an optimized proportion of composite plant essential oil and modified atmosphere which is a key technology for realizing the method, and belongs to the technical field of preservation.

Related Art

Beef is rich in nutrition and high in water content, but is extremely subjected to deterioration, color change and taste change after being affected by aspects of biological, chemical and physical factors in a storage, circulating and selling process, its edible value and commercial value are severely affected, and a shelf life is reduced. Modified atmosphere packaging is to adopt composite gas ($O_2$, $N_2$, $CO_2$ and the like) to replace the air in a packaging box or bag, to achieve the aim of inhibiting bacteria (microorganism) growth and propagation, thus prolonging the shelf life. $CO_2$ gas can inhibit growth and propagation of most putrefying bacteria and mould; $O_2$ can inhibit growth and propagation of most anaerobic bacteria, keep fresh meat color and maintain fresh fruit and vegetable to perform aerobic respiration; $N_2$ can serve as filling gas, and does not react with the meat; plant essential oil has better anti-bacteria and killing activity and anti-free radical oxidation effect, can serve as a natural food preservative and antiseptic, has volatility and can serve as special gas.

Reasonable modified atmosphere packaging can ensure hygienic quality of a meat product and prolong the shelf life and can also generate good effect for light sensing quality of the meat product. YANG Shengsheng invented "a meat modified atmosphere preservation method", in which 30% $CO_2$ and 70% $O_2$ are adopted for modified atmosphere packaging, storage is performed at 4-8° C. and a meat preserving effect is good (CN101356935A). WANG Zhiqin et al. invented "a modified atmosphere packaging beef low temperature preservation method", which indicates that an optimal modified atmosphere proportion is 50% $O_2$+25% $CO_2$+25% $N_2$ and 55% $O_2$+35% $CO_2$+10% $N_2$, and can achieve a preservation effect of 24 d (CN101889601A). David, J. Warburton considered that when the $CO_2$ concentration in the mixed gas is larger than 20%, the growth speed of aerobic bacteria is reduced by one time. The 100% $CO_2$ modified atmosphere packaging has the best antiseptic effect but the worst meat color; and 75% $O_2$ and 25% $CO_2$ modified atmosphere packaging has the best meat color but the worst antiseptic effect and a short shelf life. WANG Yonggang et al. researched "optimization of modified atmosphere packaging gas ratio for cold fresh mutton", in which the optimal modified atmosphere preservation gas ratio of 75% $CO_2$, 10% $O_2$ and 15% $N_2$ is selected and can keep the cold fresh mutton at second level freshness within 18 d. FU Li et al. researched "the research of modified atmosphere packaging on preservation and color protection of cold and fresh pork", indicating that the optimal modified atmosphere packaging mixed gas ratio for the chilled pork is 50% $CO_2$ and 40% $O_2$ and 10% $N_2$ which can greatly prolong the shelf life of chilled meat in spite of the darker meat color, the aerobic bacterial count is 5.3 lgcfu/g during storage of 21 d, and in addition, a mixed gas with the proportion of 30% $CO_2$, 60% $O_2$ and 10% $N_2$ can keep the meat color fresh red within 14 d. XIE Jing et al. researched "preservation effect for chilled meat by combining modified atmosphere of oxygen of different proportions with ice temperature", and adopted 20% $CO_2$+80% $O_2$, 20% $CO_2$+20% $O_2$+60% $N_2$ and 20% $CO_2$+80% $N_2$ to research the effect of modified atmosphere with oxygen of different proportions on the chilled pork at an ice temperature, a result indicates that the modified atmosphere packaging with both 80% $O_2$ and 20% $O_2$ can maintain the color of the chilled meat long term and better inhibit the propagation of microorganism, has a hygienic standard exceeding that of the chilled meat if the storage is over 24 d, the difference is not obvious but the advantages in the aspects of juice loss rate and water retention are achieved. Research proves that a mixed gas consisting of 50% $O_2$, 25% $CO_2$ and 25% $N_2$ can keep the meat color red fresh, achieves antiseptic and preservation effects and prevents the collapsing phenomenon of the package caused by the concentration change of $CO_2$, and the meat is preserved for 7-10 d under the refrigeration requirement of 0-4° C. Therefore, overhigh concentration $O_2$ and $CO_2$ modified atmosphere packaging is not favorable for the preservation of fresh meat. In conclusion, high concentration oxygen modified atmosphere has better color of fresh meat but poor antiseptic effect, high concentration carbon dioxide smodified atmosphere has poor color of fresh meat, therefore the invention concepts and designs an oxygen, carbon dioxide and nitrogen multielement modified atmosphere proportion solution which synthesizes the change rules of the sensory properties, physicochemical properties and bacterium phases of the beef during storage, determines various indexes of the beef quality and explores gas proportion components with the optimal beef preserving effect.

Plant essential oil is the important secondary metabolite of plants, consists of simple compounds with smaller molecular weights and has certain aromatic flavor. In recent years, the natural plant essential oil replacing the chemical synthetic substance as the food preservative becomes a research hot spot, and the plant essential oil contains multiple low molecular antiseptic substances and antioxidation components, and has been widely used for food preservation in many nations and regions as a natural non-toxic food antiseptic bacteriostatic agent. LIU Xiaoli et al. researched "inhibition action of composite spice essential oil to single-core proliferative listeria in pork", which indicates that clove, cinnamon and black pepper essential oil have higher inhibition action on single-core proliferative listeria, the essential oil generate an additive action by compounding, so that the antibacterial effect of the composite essential oil is enhanced, in addition, in the research "application of composite spice essential oil in preservation of chilled pork", a preservative compounded by 0.5% clove+0.5% cinnamon+0.5% black pepper essential oil has better preservation effect for the pork, and the shelf life of the chilled pork can be prolonged to 15 d in combination with vacuum packaging and (4+/−1)° C. storage. The result of "antimicrobial activity of illicium verum essential oil and application research thereof to meat preservation" of CHEN Qi et al. indicates that the illicium verum essential oil has certain inhibition action to *escherichia coli, saccharomycetes* and *rhizopus oryzae* and can keep the freshness of the meat. The result of "research of preservation effect of cinnamon essential oil and clove essential oil to preservation effect of chilled pork" of YAO Chengqiang et al. indicates that a composite preservative prepared from 0.8% cinnamon essential oil and 0.8% clove essential oil has the best preservation effect for the pork in combination with the low temperature (3.0+/−0.5)° C. storage. JIANG Jiefang et al. used pepper essential oil extracted by supercritical $CO_2$ to process pork, the pork is stored at 0-4° C. in combination with vacuum packaging, the growth of spoilage microorganisms of the meat is effectively inhibited, the shelf life of the chilled pork is prolonged, and the preservation effect is improved along with the increase of the concentration of the pepper essential oil. The research "bacteriostat and preservation effect of cumin essential oil for chilled meat" of Haili Binuer indicated that the inhibition rate of the cumin essential oil for zoospores released from *phytophthora capsici sporangiums* is 96.64%, and the cumin essential oil has a bacteriostat and preservation effect, and can prolong the freshness of the meat. LIU Lin et al researched the preservation effect of six kinds of spice essential oil of clove essential oil, cinnamon essential oil, pericarpium citri reticulatae essential oil, garlic essential oil, anise essential oil and mustard essential oil to conditioned chicken meat and the result indicates that the clove essential oil, cinnamon essential oil and mustard essential oil have the best preservation effect, in addition, by compounding 0.03% clove essential oil, 0.09% cinnamon essential oil and 0.06% mustard essential oil, the shelf life of fresh conditioned chicken meat stored at (4+/−1)° C. can be prolonged to 21 d. GU Renyong et al. researched the preservation effect of a composite preservative prepared by four kinds of spice essential oil of clove, cinnamon, fruit of cubeb litsea tree and majoram to the pork, the result indicates that the composite preservative containing 9% cinnamon essential oil+9% fruit of cubeb litsea tree essential oil+9% majoram essential oil can prolong the shelf life of the refrigerated pork in combination with vacuum packaging in a case of storage under 0-4° C. In conclusion, the clove essential oil, illicium verum essential oil and cinnamon essential oil have strong bacteriostat effect and obvious fresh meat preservation effect, but if the plant essential oil is used for preserving the fresh meat singly, the use level is larger and the aromatic flavor is thicker. The invention combines the synergistic effect of antibacterial activity and antioxidation of the composite plant essential oil, adopts lower-concentration composite plant essential oil and lower oxygen concentration to inhibit microorganism growth and maintain color of fresh meat stable, and volatile aromatic substances of the plant essential oil serve as the specific gas components for modified atmosphere preservation.

In the research "bacteriostatic activity research of lotus leaf essential oil cooperated with modified atmosphere packaging to fresh meat" of ZHANG Yunbin et al., the lotus leaf essential oil of different concentrations is combined with high oxygen modified atmosphere packaging (80% $O_2$, 20% $CO_2$) and low oxygen modified atmosphere packaging (20% $O_2$, 50% $CO_2$, 30% $N_2$) to perform bacteriostatic test on the *escherichia coli, staphylococcus aureus* and *salmonella* in meat, the result shows that the antibacterial effect of 2.0% lotus leaf essential oil combined with low oxygen modified atmosphere packaging is better than that of 2.0% lotus leaf essential oil combined with high oxygen modified atmosphere packaging, but fresh color of the meat cannot be kept. But this research only aims at the bacteriostatic activity of synergic preservation of the lotus leaf essential oil with 80% high oxygen modified atmosphere and 20% low oxygen modified atmosphere to the *escherichia coli, staphylococcus aureus* and *salmonella* in the fresh meat and does not synthesize the sensory properties, elasticity and other physicochemical indexes of the fresh meat for research and analysis, while after pretreatment of the composite essential oil, the present invention combines the modified atmosphere packaging for preservation and synthesizes the bacteria phase change, physicochemical indexes and sensory properties of the fresh meat to explore the optimal composite essential components and modified atmosphere proportion, and achieve the design requirements.

SUMMARY

The present invention aims to provide a method for preserving beef by combining composite essential oil and modified atmosphere and selects a proper preservation manner for production enterprises of raw and fresh beef so as to prolong the shelf life of the beef in a cold chain selling system. The method adopts the composite essential oil in combination with a modified atmosphere preservation technology and is advanced in process, high in safety and good in preservation effect, the beef is stable in color and high in nutritional quality and is preserved for 24 d in the condition of 0-4° C., and technical indexes reach the national standard.

According to the technical solution of the invention, a method for preserving and conditioning beef by combining composite essential oil and modified atmosphere comprises the following steps:

(1) dipping: cleaning and chopping picked fresh beef, dipping in composite essential oil prepared from clove essential oil, cinnamon essential oil and illicium verum essential oil for 30 s and taking out and draining slightly;

(2) precooling: placing the beef dipped in the step (1) into a modified atmosphere packaging box and fast precooling to reduce the internal temperature to 4-8° C.;

(3) modifying atmosphere: vacuumizing the cooled modified atmosphere packaging box in the step (2), then inflating mixed gas of $O_2$, $CO_2$ and $N_2$ for modified atmosphere preservation with the inflating time of 3 s and pressure of 0.6 MPa;

(4) preserving: storing the beef subjected to the modified atmosphere packaging in the step (3) at 0-4° C.

The composite essential oil in step (1) (taking 20% of ethyl alcohol solution as a diluent) is compounded by 0.8% of clove essential oil, 0.8% of cinnamon essential oil and 0.8% of illicium verum essential oil in mass concentration.

The mixed gas in step (3) is the gas with the mixed proportion of 20% $O_2$, 50% $CO_2$ and 30% $N_2$ in volume ratio.

Finally, by pretreatment of the composite essential oil, the beef preserved by combining the modified atmosphere packaging technology can reach a preservation effect of 24 d, an aerobic bacterial count accords with the regulated range of national standard, and the sensory properties, physicochemical indexes of color, elasticity, smell and meat freshness and total volatile basic nitrogen accord with the indexes of first level fresh meat.

The invention has the beneficial effects:

1. The composite plant essential oil contains multiple low molecular antibacterial substances and antioxidant substances, can obviously inhibit the growth and propagation of microorganism in the storage process of the beef and can serve as natural and non-toxic food preservative and bacteriostatic agent to replace chemical synthesized substances.

2. The composite plant essential oil is combined with a modified atmosphere preservation technology, can obviously inhibit growth and propagation of the microorganism, maintain the fresh red color of the beef, improve hygiene and nutritional quality of the beef and prolong the shelf life.

3. Through determination, the beef preservation effect of the composite essential oil (0.8% clove essential oil+0.8% cinnamon essential oil+0.8% of illicium verum essential oil) combined with the modified atmosphere proportion (20% $O_2$+50% $CO_2$+30% $N_2$) is the best, the beef can be preserved for 24 d under 0-4° C., the aerobic bacterial count is not over 6.0 lgcfu/g, and is in the regulated range of national standard, a total volatile basic nitrogen TVB-N value is not over 20 mg/100 g and accords with the index of second level fresh meat, and the beef has the advantage of stable sensory properties such as color, cherry-red color and good preservation effect.

4. The method of storing the beef by combining the composite essential oil and the modified atmosphere is simple in process, easy to control and capable of realizing industrialized production.

DETAILED DESCRIPTION

Embodiment 1 washing and cutting picked fresh beef, randomly dividing into four groups (about 300 g), dipping in composite essential oil for 30 s, wherein the four groups of essential oil respective comprise: 0.4% clove essential oil+0.4% cinnamon essential oil+0.4% illicium verum essential oil, 0.6% clove essential oil+0.6% cinnamon essential oil+0.6% illicium verum essential oil, 0.8% clove essential oil+0.8% cinnamon essential oil+0.8% illicium verum essential oil and 1.0% clove essential oil+1.0% cinnamon essential oil+ 1.0% illicium verum essential oil, taking out and slightly draining, placing in a modified atmosphere packaging box, fast precooling for 24 h in a refrigerator, wherein the internal temperature of the precooled beef is 4-8° C.; vacuumizing the cooled modified atmosphere packaging box with beef, then inflating mixed gas of 50% $O_2$+20% $CO_2$+30% $N_2$ for preservation packaging, wherein the modified atmosphere packaging inflating time is 3 s and pressure is 0.6 MPa; and preserving the beef subjected to modified atmosphere packaging at 0-4° C. The result: the proportion of the composite essential oil is set to be 1.0% clove essential oil+1.0% cinnamon essential oil+1.0% illicium verum essential oil combined with 50% $O_2$+20% $CO_2$+30% $N_2$ for performing modified atmosphere preservation on the beef.

The result: according to the composite essential oil with the proportion of 1.0% clove essential oil+1.0% cinnamon essential oil+1.0% illicium verum essential oil combined with 50% $O_2$+20% $CO_2$+30% $N_2$ for preservation, the aerobic bacterial count of the beef till 24 d is not over 6.0 lgcfu/g, a total volatile basic nitrogen TVB-N value is not over 20 mg/100 g and belongs to the range of second level freshness, the beef is stable in color and is cherry-red but the essential oil has obvious aromatic flavor.

Embodiment 2 washing and cutting picked fresh beef, randomly dividing into four groups (about 300 g), dipping in composite essential oil for 30 s, wherein the four groups of essential oil respective comprise: 0.4% clove essential oil+0.4% cinnamon essential oil+0.4% illicium verum essential oil, 0.6% clove essential oil+0.6% cinnamon essential oil+0.6% illicium verum essential oil, 0.8% clove essential oil+0.8% cinnamon essential oil+0.8% illicium verum essential oil and 1.0% clove essential oil+1.0% cinnamon essential oil+ 1.0% illicium verum essential oil, taking out and slightly draining, placing in a modified atmosphere packaging box, fast precooling for 24 h in a refrigerator, wherein the internal temperature of the precooled beef is 4-8° C.; vacuumizing the cooled modified atmosphere packaging box with beef, then inflating mixed gas of 20% $O_2$+50% $CO_2$+30% $N_2$ for preservation packaging, wherein the modified atmosphere packaging inflating time is 3 s and pressure is 0.6 MPa; and preserving the beef subjected to modified atmosphere packaging at 0-4° C.

The result: according to the composite essential oil with the proportion of 0.8% clove essential oil+0.8% cinnamon essential oil+0.8% illicium verum essential oil as well as 1.0% clove essential oil+1.0% cinnamon essential oil+1.0% illicium verum essential oil combined with 20% $O_2$+50% $CO_2$+30% $N_2$ for preservation, the aerobic bacterial count of the beef till 24 d is not over 6.0 lgcfu/g, a total volatile basic nitrogen TVB-N value is not over 20 mg/100 g and belongs to the range of second level freshness, the beef is stable in color, the higher the essential oil concentration, the better the antibacterial effect, but the beef processed by the 1.0% clove essential oil+1.0% cinnamon essential oil+1.0% illicium verum essential oil is obvious in essential oil aromatic flavor.

Embodiment 3 washing and cutting picked fresh beef, randomly dividing into four groups (about 300 g), dipping in composite essential oil for 30 s, wherein the four groups of essential oil respective comprise: 0.4% clove essential oil+0.4% cinnamon essential oil+0.4% illicium verum essential oil, 0.6% clove essential oil+0.6% cinnamon essential oil+0.6% illicium verum essential oil, 0.8% clove essential oil+0.8% cinnamon essential oil+0.8% illicium verum essential oil and 1.0% clove essential oil+1.0% cinnamon essential oil+ 1.0% illicium verum essential oil, taking out and slightly draining, placing in a modified atmosphere packaging box, fast precooling for 24 h in a refrigerator, wherein the internal temperature of the precooled beef is 4-8° C.; vacuumizing the cooled modified atmosphere packaging box with beef, then inflating mixed gas of 70% $CO_2$+30% $N_2$ for preservation packaging, wherein the modified atmosphere packaging inflating time is 3 s and pressure is 0.6 MPa; and preserving the beef subjected to modified atmosphere packaging at 0-4° C.

The result: according to the composite essential oil with the proportion of 0.8% clove essential oil+0.8% cinnamon essential oil+0.8% illicium verum essential oil as well as 1.0% clove essential oil+1.0% cinnamon essential oil+1.0% illicium verum essential oil combined with 70% $CO_2$+30% $N_2$ for preservation, the aerobic bacterial count of the beef till 24 d is not over 6.0 lgcfu/g, a total volatile basic nitrogen TVB-N value is not over 20 mg/100 g and belongs to the range of second level freshness, but the beef is darker in color and poor in sensory property.

What is claimed is:
1. A method for preserving and conditioning beef by combining composite essential oil and modified atmosphere, comprising:
(1) cleaning and chopping picked fresh beef, dipping the fresh beef in a composite essential oil comprising a mass concentration of 0.8% clove essential oil, 0.8% cinnamon essential oil, and 0.8% illicium verum essen- tial oil in 20% ethyl alcohol diluent for 30s and taking the beef out and draining slightly;

(2) placing the beef dipped in the step (1) into a modified atmosphere packaging box and fast precooling to reduce the internal temperature to 4-8° C.;

(3) vacuumizing the cooled modified atmosphere packaging box in the step (2), then inflating a mixed gas of $O_2$, $CO_2$ and $N_2$ for modified atmosphere preservation with the inflating time of 3 s and pressure of 0.6 MPa;

(4) storing the beef subjected to the modified atmosphere packaging in the step (3) at 0-4° C.

2. The method according to claim 1, wherein the mixed gas in the step (3) is gas with a mixed proportion of 20% $O_2$, 50% $CO_2$ and 30% $N_2$ in volume ratio.

3. A method for preserving and conditioning beef by combining a composite essential oil and a modified atmosphere, comprising:

(1) cleaning and chopping picked fresh beef, dipping the fresh beef in a composite essential oil prepared from clove essential oil, cinnamon essential oil and illicium verum essential oil for 30s and taking the beef out and draining slightly;

(2) placing the beef dipped in the step (1) into a modified atmosphere packaging box and fast precooling to reduce the internal temperature to 4-8° C.;

(3) vacuumizing the cooled modified atmosphere packaging box in the step (2), then inflating a mixed gas comprising 20% $O_2$, 50% $CO_2$, and 30% $N_2$ for modified atmosphere preservation with the inflating time of 3 s and pressure of 0.6 MPa; and (4) storing the beef subjected to the modified atmosphere packaging in the step (3) at 0-4° C.

* * * * *

UNITED STATES PATENT AND TRADEMARK OFFICE
CERTIFICATE OF CORRECTION

PATENT NO. : 10,165,784 B2  
APPLICATION NO. : 15/089799  
DATED : January 1, 2019  
INVENTOR(S) : Min Zhang et al.

Page 1 of 1

It is certified that error appears in the above-identified patent and that said Letters Patent is hereby corrected as shown below:

In the Claims

Column 7, Line 13, Claim 2, delete "02," and insert -- O2, --

Column 7, Line 28, Claim 3, delete "02," and insert -- O2, --

Signed and Sealed this  
Thirtieth Day of April, 2019

Andrei Iancu  
*Director of the United States Patent and Trademark Office*